United States Patent
Tomizawa et al.

(10) Patent No.: US 11,973,453 B2
(45) Date of Patent: Apr. 30, 2024

(54) MOTOR DRIVE SYSTEM

(71) Applicants: DENSO CORPORATION, Kariya (JP); TOYOTA JIDOSHA KABUSHIKI KAISHA, Toyota (JP); JTEKT CORPORATION, Kariya (JP)

(72) Inventors: Hiroki Tomizawa, Kariya (JP); Masaharu Yamashita, Toyota (JP); Kenji Shibata, Nagoya (JP); Yosuke Yamashita, Nagoya (JP); Shoji Kubota, Nagoya (JP); Yugo Nagashima, Anjo (JP); Yuji Fujita, Okazaki (JP); Kenichi Abe, Okazaki (JP)

(73) Assignees: DENSO CORPORATION, Kariya (JP); TOYOTA JIDOSHA KABUSHIKI KAISHA, Toyota (JP); JTEKT CORPORATION, Kariya (JP)

( * ) Notice: Subject to any disclaimer, the term of this patent is extended or adjusted under 35 U.S.C. 154(b) by 139 days.

(21) Appl. No.: 17/660,817

(22) Filed: Apr. 26, 2022

(65) Prior Publication Data

US 2022/0255473 A1    Aug. 11, 2022

Related U.S. Application Data

(63) Continuation of application No. PCT/JP2020/039039, filed on Oct. 16, 2020.

(30) Foreign Application Priority Data

Oct. 31, 2019  (JP) .................................. 2019-199304

(51) Int. Cl.
*H02P 25/18*     (2006.01)
*B62D 5/04*      (2006.01)
(Continued)

(52) U.S. Cl.
CPC .................. *H02P 5/50* (2013.01); *B62D 5/04* (2013.01); *B62D 5/006* (2013.01)

(58) Field of Classification Search
CPC . H02P 5/50; H02P 29/028; H02P 5/46; B62D 5/0487
See application file for complete search history.

(56) References Cited

U.S. PATENT DOCUMENTS

2014/0222292 A1* 8/2014 Fisher .................. B62D 5/0481
                                                                 701/41
2018/0178835 A1* 6/2018 Toko .................... B62D 5/0481
(Continued)

FOREIGN PATENT DOCUMENTS

JP    2004-338563 A    12/2004
JP        4848717 B2   12/2011
JP    2017-195659 A    10/2017

*Primary Examiner* — Muhammad S Islam
(74) *Attorney, Agent, or Firm* — MASCHOFF BRENNAN

(57) ABSTRACT

A first actuator and a second actuator each have a plurality of control calculation units provided redundantly and a plurality of motor drive units provided redundantly. In the first and the second actuators, the control calculation units of the systems paired with each other transmit and receive information to and from each other by a communication between the actuators. When a failure occurs in any system in either of the two actuators, or when a failure occurs in a communication between actuators in either system, the control calculation unit of each actuator of the system in which the failure occurred stops the motor drive control. Then, the motor drive control is continued by the control calculation unit of the normal system in both actuators.

14 Claims, 10 Drawing Sheets

(51) Int. Cl.
*H02P 5/50* (2016.01)
*B62D 5/00* (2006.01)

(56) References Cited

U.S. PATENT DOCUMENTS

2020/0140005 A1* 5/2020 Fuji .................... B62D 5/0463
2020/0169208 A1* 5/2020 Koyama .................. B60L 3/04
2020/0331522 A1* 10/2020 Yamashita ............. B62D 5/046

* cited by examiner

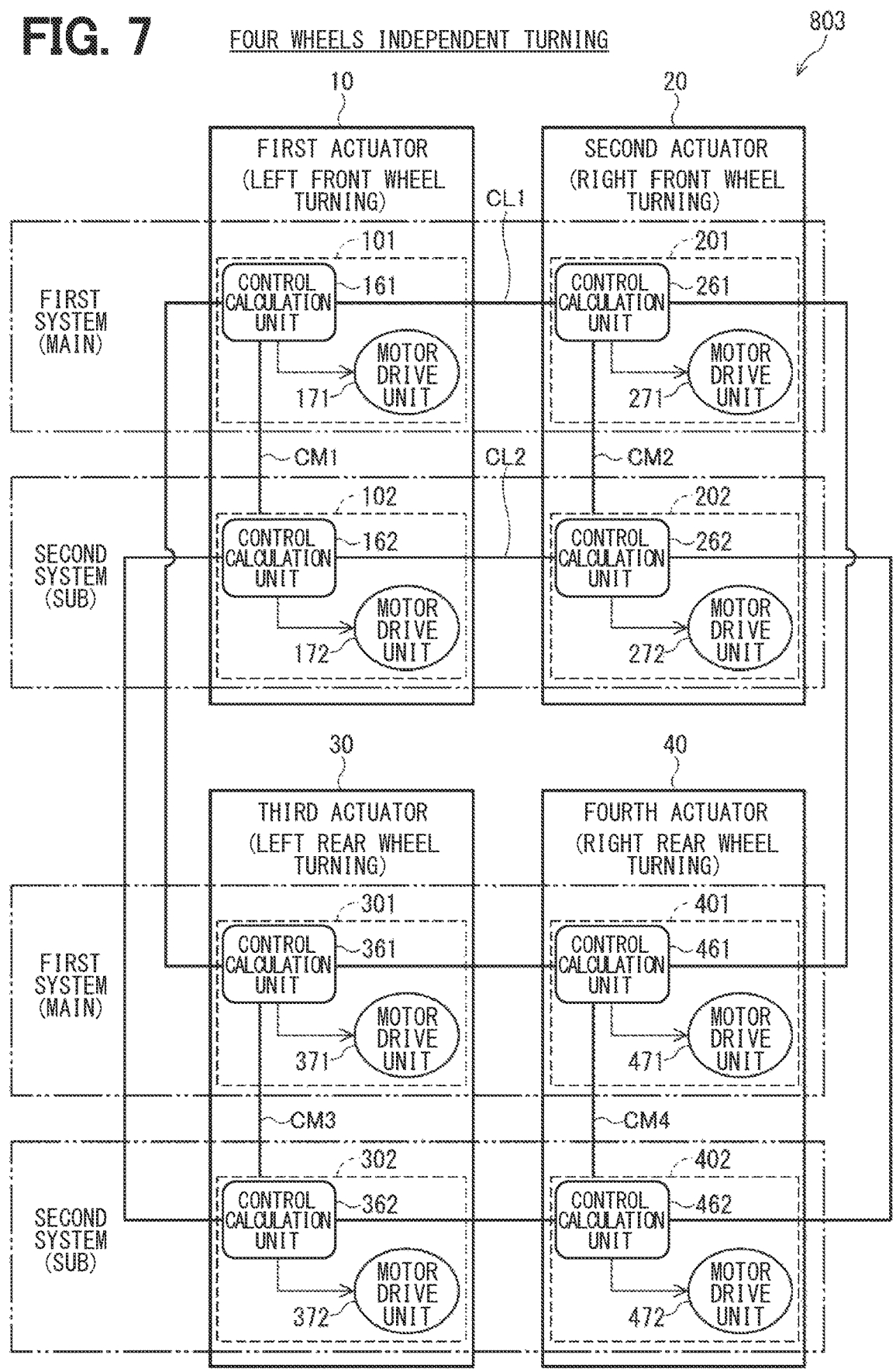
FIG. 7 FOUR WHEELS INDEPENDENT TURNING

MOTOR DRIVE SYSTEM

CROSS REFERENCE TO RELATED APPLICATIONS

This application is a continuation application of International Patent Application No. PCT/JP2020/039039 filed on Oct. 16, 2020, which designated the U.S. and based on and claims the benefits of priority of Japanese Patent Application No. 2019-199304 filed on Oct. 31, 2019. The entire disclosure of all of the above applications is incorporated herein by reference.

TECHNICAL FIELD

The present disclosure relates to a motor drive system.

BACKGROUND

Conventionally, in a motor drive system that generally drives a motor, a plurality of control calculation units that perform calculations related to motor drive and a plurality of motor drive units that drive the motor based on a drive signal generated by the control calculation unit are redundantly provided.

SUMMARY

An object of the present disclosure is to provide a motor drive system for preventing erroneous output of the other actuator due to a failure of either the first actuator or the second actuator, or a failure of communication between actuators.

The present disclosure is a motor drive system including a plurality of actuators including a first actuator and a second actuator, each of which functions as a motor that outputs torque.

The first actuator and the second actuator each have a plurality of control calculation units provided redundantly and a plurality of motor drive units provided redundantly. The plurality of control calculation units perform calculations related to a motor drive control. The plurality of motor drive units are operated based on the drive signals generated by the corresponding control calculation units and output the torque.

A unit of a combination of the control calculation unit and the motor drive unit corresponding to each other in each actuator is defined as "system". In the first actuator and the second actuator, the control calculation units of the systems paired with each other transmit and receive information to and from each other by a communication between the actuators.

When a failure occurs in any system in either of the two actuators, or when a failure occurs in a communication between actuators in either system, the control calculation unit of each actuator of the system in which the failure occurred stops the motor drive control. Then, the motor drive control is continued by the control calculation unit of the normal system in both actuators.

BRIEF DESCRIPTION OF DRAWINGS

The above and other objects, features and advantages of the present disclosure will become more apparent from the following detailed description made with reference to the accompanying drawings.

In the drawings:

FIG. 7 is an overall configuration diagram of a motor drive system according to a third embodiment;

DETAILED DESCRIPTION

Figure 1:
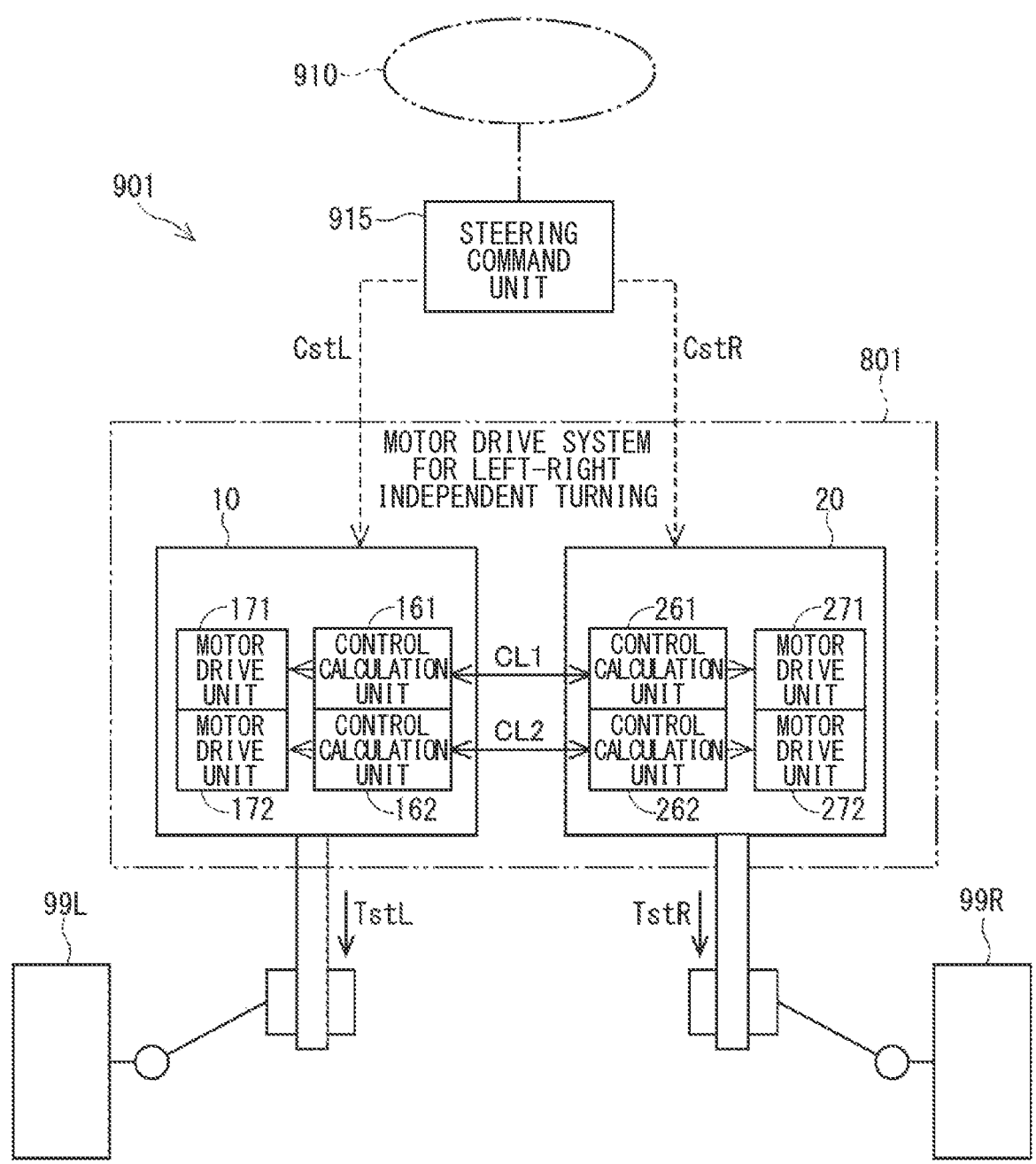
FIG. 1 is an overall configuration diagram of a motor drive system according to a first embodiment.

In an assumable example, in a motor drive system that generally drives a motor, a plurality of control calculation units that perform calculations related to motor drive and a plurality of motor drive units that drive the motor based on a drive signal generated by the control calculation unit are redundantly provided. For example, a fail-safe control device of the control system disclosed in Japanese Patent No. 4848717, when one of the two ECUs fails, stops the failed ECU and continues the control by one normal ECU. Further, when one of the two motors fails, the failed motor is stopped and control is continued using one normal motor.

A device of a third embodiment disclosed in Japanese Patent No. 4848717 (hereinafter, referred to as Patent Document) has two reaction force ECUs (A) and (D), each of which controls a drive of a steering reaction force motor, and two turning ECUs (B) and (C) each of which controls a drive of a turning motor. For example, when one reaction force ECU (A) fails, the device stops the reaction force ECU (A), and continues one normal reaction force ECU (D), two turning ECUs (B) and (C), and the drive control of the steering reaction force motor and the turning motor.

In the present specification, a configuration including the "reaction force ECU" and the "steering reaction force motor" of Patent Document is generalized as a "first actuator", and a configuration including the "turning ECU" and the "turning motor" is generalized as a "second actuator". Further, the "reaction force ECU" and the "steering reaction force motor" of Patent Document are respectively referred to as a "control calculation unit of the first actuator" and a "motor drive unit of the first actuator". The "turning ECU" and "turning motor" of Patent Document are respectively referred to as a "control calculation unit of the second actuator" and a "motor drive unit of the second actuator".

The entire disclosure of Japanese Patent No. 4848717 as Patent Document is incorporated herein by reference.

That is, the "first actuator" and the "second actuator" in the present specification may be actuators for any purpose. Further, the "actuator" includes not only a mechanical element driven by a drive signal from an outside but also a drive device in which a motor drive unit outputs torque by a drive signal generated by a control calculation unit inside the actuator. The control calculation unit and the motor drive unit in the actuator may be physically integrated or may be separately configured via a signal line.

In Patent Document, a configuration in which the reaction force ECU (A) which is "one control calculation unit of the first actuator" and the turning ECU (B) which is "one control calculation unit of the second actuator" form a pair and send and receive information to and from each other is assumed. If one of the control calculation units of the first actuator fails or a communication between the actuators fails, an information input to the control calculation unit of the paired second actuator also becomes an abnormal value or no information is input to the control calculation unit of the paired second actuator. Therefore, the motor drive unit controlled by the control calculation unit of the paired second actuator may erroneously output, and the system may malfunction. Therefore, there is a problem from the viewpoint of fail safe.

An object of the present disclosure is to provide a motor drive system for preventing erroneous output of the other actuator due to a failure of either the first actuator or the second actuator, or a failure of communication between actuators.

The present disclosure is a motor drive system including a plurality of actuators including a first actuator and a second actuator, each of which functions as a motor that outputs torque.

The first actuator and the second actuator each have a plurality of control calculation units provided redundantly and a plurality of motor drive units provided redundantly. The plurality of control calculation units perform calculations related to a motor drive control. The plurality of motor drive units are operated based on the drive signals generated by the corresponding control calculation units and output the torque. For example, in a polyphase brushless motor, the motor drive unit is composed of an inverter that supplies voltage, a polyphase winding wound around a stator, a rotor having a permanent magnet, and the like. In addition, like a multi-winding motor, a rotor or the like may be provided in common in a plurality of motor drive units.

A unit of a combination of the control calculation unit and the motor drive unit corresponding to each other in each actuator is defined as "system". In the first actuator and the second actuator, the control calculation units of the systems paired with each other transmit and receive information to and from each other by the communication between the actuators.

When a failure occurs in any system in either of the two actuators, or when a failure occurs in a communication between actuators in either system, the control calculation unit of each actuator of the system in which the failure occurred stops the motor drive control. Then, the motor drive control is continued by the control calculation unit of the normal system in both actuators.

Thereby, in the present disclosure, in the case of a failure of either the first actuator or the second actuator, or a failure of communication between the actuators of either one system, erroneous output of the other actuator due to the failure is prevented, and the system malfunction is avoided. Further, since the motor drive control is continued by the control calculation unit of the normal system in both the actuators, the drive function can be ensured. Therefore, the fail-safe function is appropriately realized.

In particular, when a failure occurs in any system in either of the two actuators and the communication between the actuators of the system is normal, the control calculation unit of the system in which the failure has occurred transmits an abnormal signal to the control calculation unit of the system paired with the other actuator. The control calculation unit that has received the abnormal signal stops the motor drive control. As a result, the motor drive control can be quickly stopped in the control calculation unit of the system paired with the system in which the failure has occurred.

Hereinafter, a plurality of embodiments of a motor drive system of the present disclosure will be described with reference to the drawings. The motor drive system of each embodiment includes a plurality of actuators, each of which functions as a motor that outputs torque. Each actuator has a plurality of control calculation units provided redundantly and a plurality of motor drive units provided redundantly. A unit of a combination of the control calculation unit and the motor drive unit corresponding to each other in each actuator is defined as "system". In the following embodiments, substantially same structural parts are designated with the same reference numerals thereby to simplify the description. Further, the first to fourth embodiments are collectively referred to as a "present embodiment".

First Embodiment

FIG. 1 shows a motor drive system 801 applied to a vehicle turning system 901. As a vehicle, an autonomous vehicle in which a driver does not operate a steering wheel or an unmanned vehicle is assumed. A steering command unit 915 outputs a turning command to the motor drive system 801 according to a predetermined route program and route information to a destination by a navigation device. A dummy steering wheel 910 indicated by the alternate long and short dash line may rotate in a pseudo manner in response to the turning command.

In this vehicle, a left wheel 99L and a right wheel 99R turn independently. The motor drive system 801 includes a first actuator 10 for turning the left wheel and a second actuator 20 for turning the right wheel. In the figure below, "Act" means "actuator". The first actuator 10 outputs a turning torque TstL of the left wheel 99L based on a left wheel turning command CstL from the steering command unit 915. The second actuator 20 outputs a turning torque TstR of the right wheel 99R based on a right wheel turning command CstR from the steering command unit 915.

Each actuator 10 and 20 has a redundant configuration of two systems. That is, the first actuator 10 has two control calculation units 161 and 162 provided redundantly, and two motor drive units 171 and 172 provided redundantly. That is, the second actuator 20 has two control calculation units 261 and 262 provided redundantly, and two motor drive units 271 and 272 provided redundantly.

Hereinafter, the two systems of each actuator are referred to as "first system" and "second system". For example, there may be a master-slave relationship between the first system and the second system, and the first system may function as a main (or master) and the second system may function as a sub (or slave). Alternatively, the first system and the second system may have an equal relationship. "1" is added to an end of the code for an element of the first system, and "2" is added to an end of the code to an element of the second system.

Since a basic configurations of each of the actuators 10 and 20 is the same, the points where one of the explanations is sufficient will be described by the elements of the first actuator 10 as a representative. The second actuator 20 can be interpreted by reading the corresponding reference numeral. The control calculation units 161 and 162 are specifically composed of a computer and an ASIC, and perform calculations related to motor drive control. The control calculation units 161 and 162 may also perform control other than motor drive control, but this specification does not refer to other controls. As will be described later, when the control calculation unit "stops motor drive control", it does not mention whether or not to stop other controls.

Specifically, the control calculation units 161 and 162 include a CPU, ROM, RAM, I/O (not shown), a bus line connecting these configurations, and the like. The control calculation units 161 and 162 performs required control by executing software processing or hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The motor drive units 171 and 172 drive the motors based on the drive signals generated by the corresponding control calculation units 161 and 162, and output a torque. For example, in a polyphase brushless motor, the motor drive units 171 and 172 are composed of an inverter that supplies voltage, a polyphase winding wound around a stator, a rotor having a permanent magnet, and the like. The motor drive units 171 and 172 in two systems cooperate to output the torque. For example, the motor drive units 171 and 172 may be configured as a double winding motor in which two polyphase windings are wound around a common stator.

In the figure, an arrow from the control calculation unit 161 to the motor drive unit 171 and an arrow from the control calculation unit 162 to the motor drive unit 172 respectively indicate a drive signal of each system. In the case of a polyphase brushless motor, the drive signal is a switching pulse signal of an inverter, and is typically a PWM signal or the like. Although not shown in figures, the control calculation units 161 and 162 may generate a drive signal based on an actual turning angle fed back and a correlation amount thereof in addition to the turning command CstL from the steering command unit 915.

As described above, in the present specification, a term "actuator" is used as a unit drive device including a plurality of control calculation units and a plurality of motor drive units. For example, in Patent Document, apart from the ECU that calculates the drive signal, only the motor main body portion, which is a mechanical element, is treated as an actuator, and the interpretation of term "actuator" is different from the present specification. The actuator of the present embodiment may be a so-called "mechatronics-integrated" motor in which the control calculation unit and the motor drive unit are physically integrated. Alternatively, as a so-called "mechatronics separated type" motor, the control calculation unit and the motor drive unit may be separately configured via a signal line.

The first system of the first actuator 10 and the first system of the second actuator 20 form a pair with each other. Further, the second system of the first actuator 10 and the second system of the second actuator 20 form a pair with each other. In the first actuator and the second actuator, the control calculation units of the systems paired with each other transmit and receive information to and from each other by a communication CL1 and CL2 between the actuators. A second character "L" of the symbol for communication between the actuators is derived from a "local communication".

The "information transmitted to and received from each other" by the communication between the actuators includes at least the abnormality information of each of the actuators 10 and 20. Abnormalities in the control calculation unit include data abnormality, arithmetic processing abnormality, internal communication abnormality, synchronization abnormality, and the like. Abnormalities in the motor drive unit include abnormality in a switching element of the inverter, short circuit of a relay provided in the circuit, open failure, disconnection failure of the motor winding, and the like. When these failures occur, the actuators 10 and 20 transmit and receive the information to and from each other.

Figure 2:
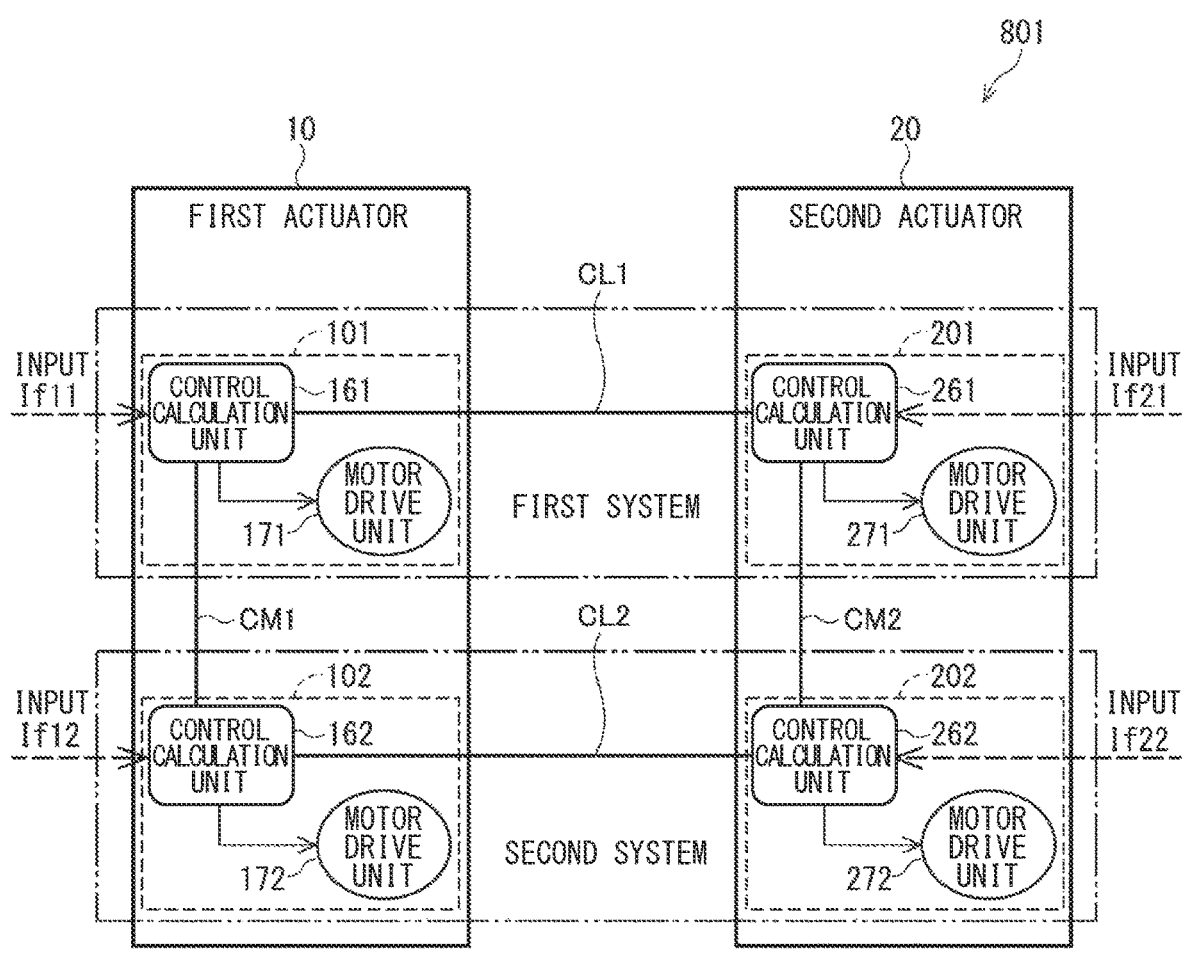
FIG. 2 is a schematic diagram of the motor drive system of FIG. 1.

FIG. 2 shows a simplified schematic diagram of the motor drive system 801 of FIG. 1. FIG. 1 shows a left-right independent turning system as a specific application example, and the first actuator 10 and the second actuator 20 of the present embodiment may be motors for any purpose. FIG. 2 generally shows the configuration of a "motor drive system 801 including two actuators 10 and 20 having a two system redundant configuration". Each configuration diagram in the embodiments after the second embodiment is also described according to FIG. 2. In FIG. 2, a broken line frame is shown for the first system and the second system of the actuators 10 and 20, and the reference numerals are given to "first system 101, 201" and "second system 102, 202". However, in the following explanation, a code of the system may be omitted as appropriate in places that are obvious from the context.

Although it partially overlaps with the description of FIG. 1, the configurations of the actuators 10 and 20 will be described again. The first actuator 10 is redundantly provided with the control calculation unit 161 of the first system 101 and the control calculation unit 162 of the second system 102, and is also redundantly provided with the motor drive unit 171 of the first system 101 and the motor drive unit 172 of the second system 102. The second actuator 20 is redundantly provided with the control calculation unit 261 of the first system 201 and the control calculation unit 262 of the second system 202, and is also redundantly provided with the motor drive unit 271 of the first system 201 and the motor drive unit 272 of the second system 202.

In the configuration of FIG. 2, in each of the actuators 10 and 20, information such as a command signal from the turning command unit 915 and a feedback signal indicating the actual turning angle is redundantly input to the control calculation unit of each system. That is, instead of one information signal being branched and input to the control calculation unit of each system, an information signal generated exclusively for the first system is input to the first system and an information generated exclusively for the second system is input is input to the second system.

For example, regarding the first actuator 10, an information If11 is redundantly input to the control calculation unit 161 of the first system 101, and an information If12 is redundantly input to the control calculation unit 162 of the second system 102. Further, regarding the second actuator 20, an information If21 is redundantly input to the control calculation unit 261 of the first system 201, and an information If22 is redundantly input to the control calculation unit 262 of the second system 202. As a result, when the input unit of the control calculation unit of one system fails, the control calculation unit of the other system can acquire correct information.

Further, the control calculation unit 161 of the first system 101 and the control calculation unit 162 of the second system 102 in the same first actuator 10 mutually transmit and receive information by the communication CM1 between the systems. The control calculation unit 261 of the first system 201 and the control calculation unit 262 of the second system 202 in the same second actuator 20 mutually transmit and receive information by the communication CM2 between systems. A second character "M" of the symbol for the communication between the systems derived from "communication between microcomputers". The information transmitted to each other by the communication CM1 and CM2 between the systems includes, for example, an input value from the outside, a current command value calculated by the control calculation unit, a current limit value, an actual current to be fed back, and the like. In addition, abnormal signals of each system are transmitted and received to each other.

As described above, the first system 101 of the first actuator 10 and the first system 201 of the second actuator 20 form a pair with each other, and the second system 102 of the first actuator 10 and the second system 202 of the second actuator 20 are paired with each other. That is, the systems having the same number form a pair with each other. However, the terms "first system" and "second system" are only assigned for convenience, and it is free to decide which of the two systems is "first system" and which of the two system is "second system". Depending on the system, the "first system of the first actuator" and the "second system of the second actuator" may form a pair, and the "second system of the first actuator" and the "first system of the second actuator" may form a pair.

In the first actuator 10 and the second actuator 20, the control calculation units of the systems paired with each other transmit and receive information to and from each other by the communication between the actuators. Therefore, the control calculation units 161 and 261 of the first system of the actuators 10 and 20 mutually transmit and receive information by the communication CL1 between the actuators. The control calculation units 162 and 262 of the second system of the actuators 10 and 20 mutually transmit and receive information by the communication CL2 between the actuators.

Figure 3:
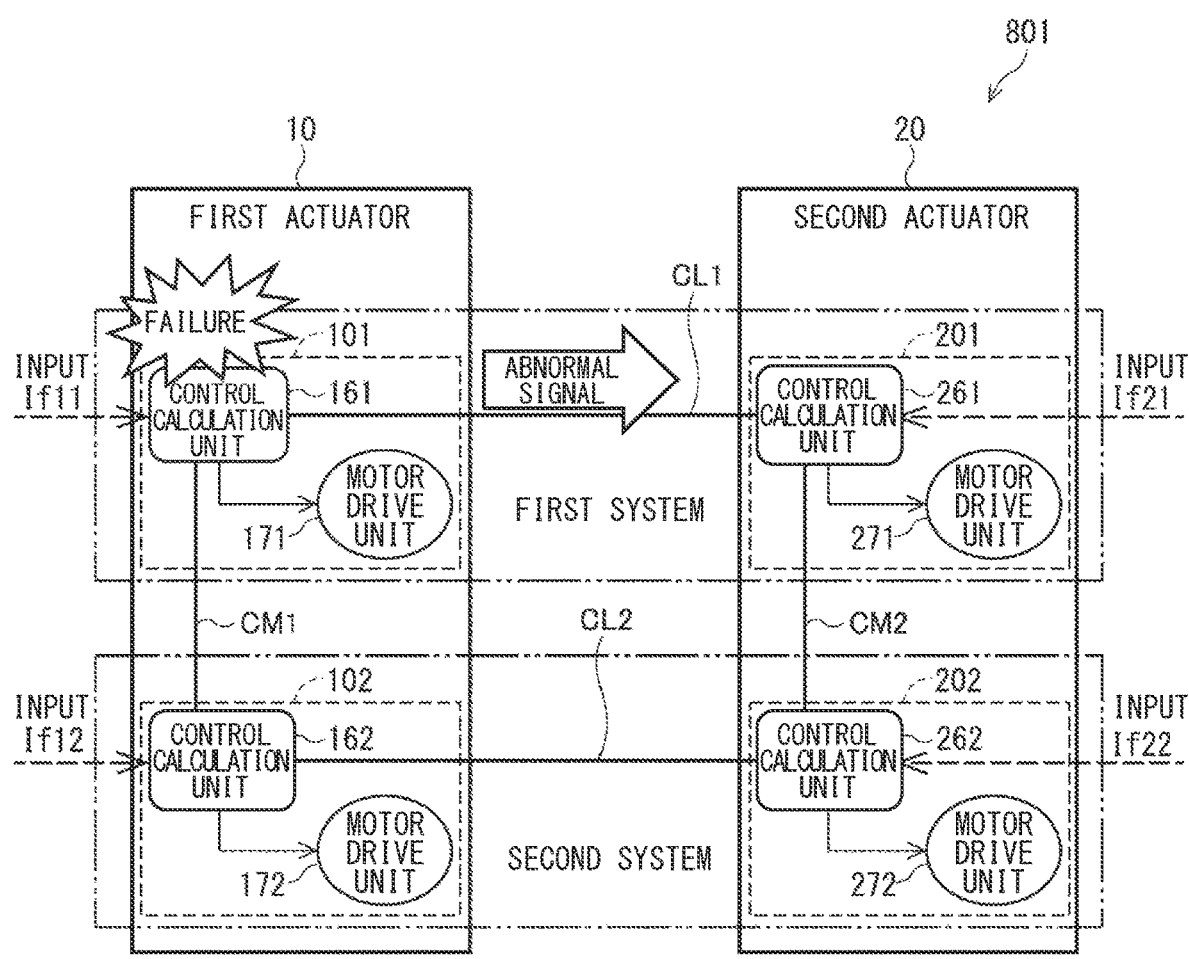
FIG. 3 is a diagram showing transmission of an abnormal signal when a failure occurs.
Figure 4:
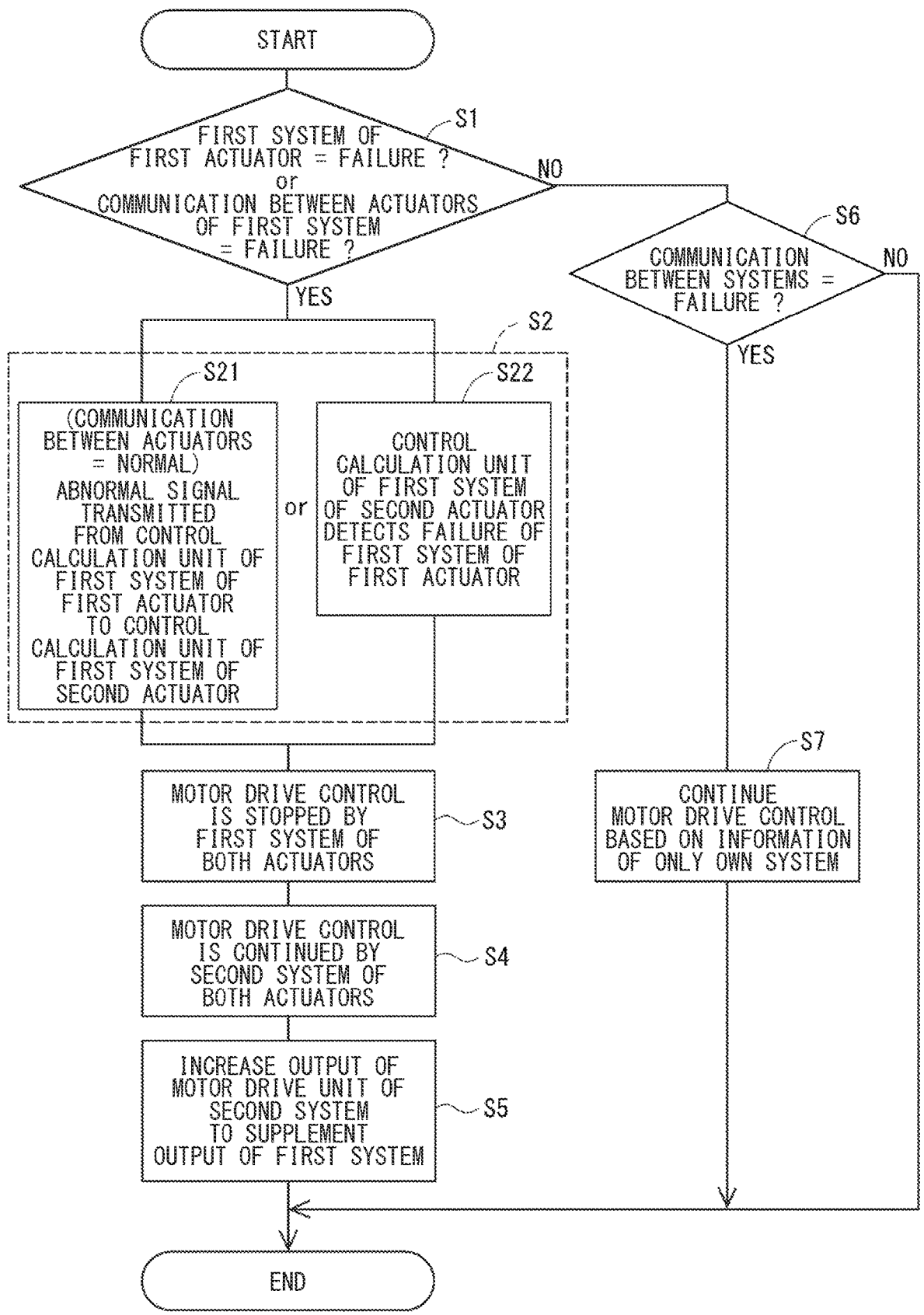
FIG. 4 is a flowchart of a motor drive control stop process when a failure occurs.

Next, with reference to FIGS. 3, 4, 5A and 5B, the operation of the motor drive system 801 will be described by taking as an example a case where a failure occurs in the first system of the first actuator 10. FIG. 3 shows an example in which an abnormality signal is transmitted when a failure occurs in the motor drive system 801 of FIG. 2. In the flowchart of FIG. 4, the symbol "S" indicates a step.

Figure 5A:
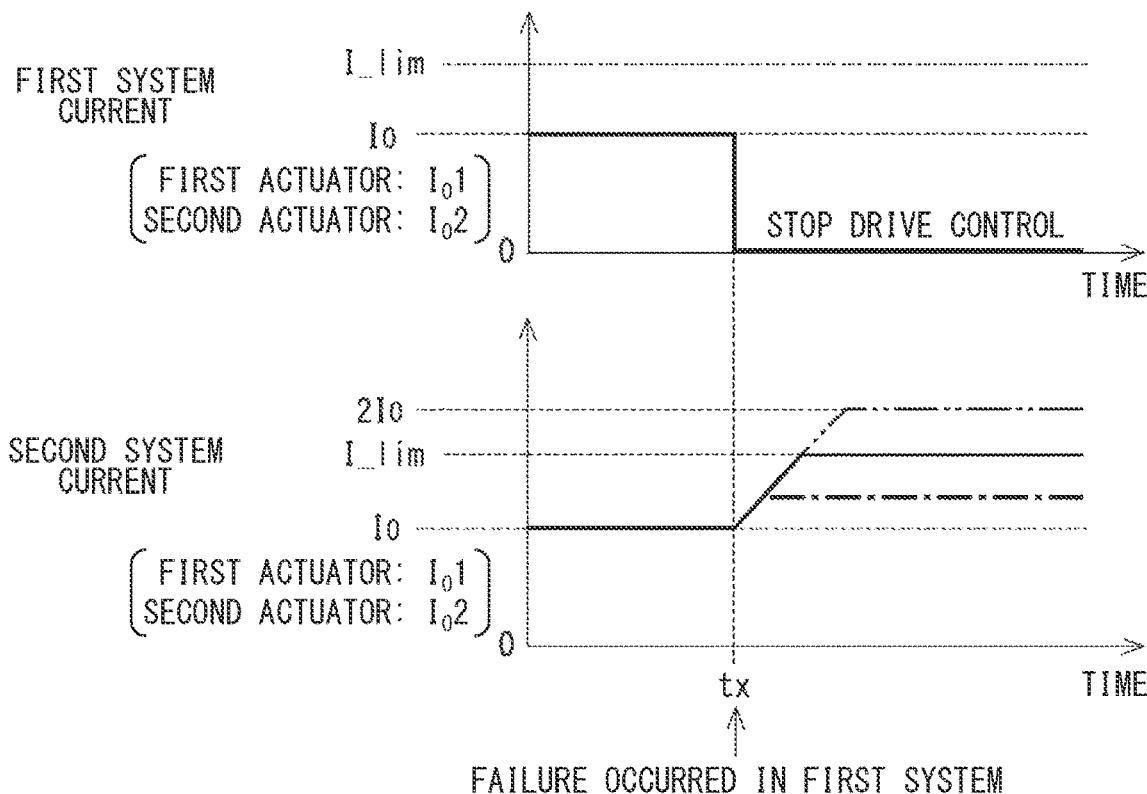
FIG. 5A is a time chart showing output changes when a failure occurs in one system.
Figure 5B:
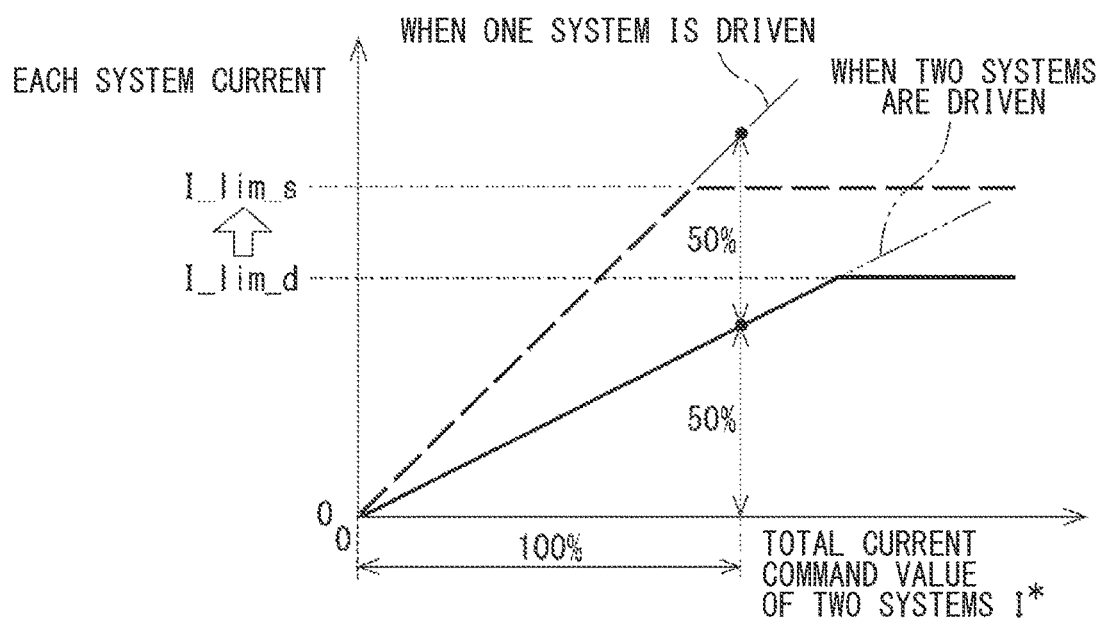
FIG. 5B is a diagram showing a relationship between a total current command value of two systems and a current limit value.

In FIGS. 5A and 5B, in the motor drive by a current feedback control, an output change of the motor drive unit at the time of failure is represented by a current command value after a limitation by the control calculation unit of each system. A current flows from the inverter of the motor drive unit to the multi-phase winding based on the current command value in each actuator 10 and 20, so that the motor drive unit of each actuator 10 and 20 outputs a desired torque.

As shown in FIG. 5A, in a normal time before the time tx, current $I_0 1$ having a current limit value I_lim or less and equivalent to each other flows through the motor drive units 171 and 172 of the first system and the second system of the first actuator 10. Further, current $I_0 2$ having a current limit value I_lim or less and equivalent to each other flows through the motor drive units 271 and 272 of the first system and the second system of the second actuator 20. A relationship between the normal current $I_0 1$ of the first actuator 10 and the normal current $I_0 2$ of the second actuator 20 may or may not be correlated depending on the applications and characteristics of the actuators 10 and 20. Hereinafter, focusing only on the fact that the currents are the same between the first system and the second system, the actuators 10 and 20 are not distinguished, and the normal current is simply referred to as "$I_0$".

Then, it is assumed that a failure has occurred in the first system of the first actuator 10 at time tx, and at this time, it is determined as YES in S1 of FIG. 4. Further, when a failure occurs in the communication CL1 between actuators of the first system, it is determined as YES in S1. If YES in S1, in S2, the control calculation unit 261 of the first system of the second actuator 20 recognizes the occurrence of a failure in the first system of the first actuator 10 by one of two steps of S21 and S22. In S21, it is assumed that the communication between the actuators is normal.

In S21, as shown in FIG. 3, an abnormality signal is transmitted from the control calculation unit 161 of the first system of the first actuator 10 to the control calculation unit 261 of the first system of the second actuator 20. That is, the abnormal signal is transmitted from the "control calculation unit of the system in which the failure has occurred in the actuator in which the failure has occurred" to the control calculation unit of the same system of the other actuator. The control calculation unit 261 of the second actuator 20 that has received the abnormality signal stops the motor drive control in S3. Therefore, in S3, the control calculation units 161 and 261 of the first system of both actuators 10 and 20 both stop the motor drive control.

Further, in S22, the control calculation unit 261 of the first system of the second actuator 20 detects a failure of the first system of the first actuator 10. In S3, the control calculation unit 161 of the first system of the first actuator 10 stops the motor drive control, and the control calculation unit 261 of the first system of the second actuator 20 that detects the failure stops the motor drive control by itself. Similarly, when the control calculation unit 261 of the first system of the second actuator 20 detects that a failure has occurred in the communication CL1 between actuators of the first system, the control calculation unit 261 stops the motor drive control by itself.

In S4, in both actuators 10 and 20, the motor drive is continued by the control calculation units 162 and 262 of the second system which is normal. In S5, the control calculation units 162 and 262 of the second system, which is a normal side system, increase the outputs of the motor drive units 172 and 272 of the second system with respect to the normal time of both systems so as to supplement the output of the motor drive units 171, 271 of the first system, which is a failure side system.

As shown in FIG. 5A, the drive control is stopped at time tx, and the current $I_0$ of the first system becomes 0. Therefore, if the motor drive unit 172, 272 of the second system can energize twice the current ($2I_0$) as normal as shown by the alternate long and short dash line, the total output of the two systems before the failure can be completely maintained. However, when twice the current ($2I_0$) as normal exceeds the current limit value I_lim, the current of the second system may be increased to the current limit value I_lim as shown by the solid line. Alternatively, as shown by the alternate long and short dash line, the current of the second system may be increased to a value between the normal current $I_0$ and the current limit value I_lim.

The above mentioned examples correspond to the control of "increasing the output of the motor drive unit of the second system with respect to the normal time of both systems so as to supplement the output of the motor drive unit of the first system". That is, the control is not limited to completely maintaining the total output of the two systems before the failure, and supplements at least a part of the output of the motor drive of the first system by increasing the current of the second system as much as possible with respect to the normal current. By appropriately increasing the output of the motor drive unit of the second system, it is possible to prevent heat generation due to an excessive current.

Further, as shown in FIG. 5B, the current limit value I_lim_s of the normal system at the time of failure of one system may be increased with respect to the current limit value I_lim_d in the normal state of both systems. As a result, the output of the motor drive unit of the first system can be supplemented by one system drive of the second system until the total current command value I* of the two systems is larger.

Subsequently, the process in the case of NO in S1 of FIG. 4 will be described. In S6, it is determined whether the communication CM1 and CM2 between the systems in the first actuator 10 or the second actuator 20 have failed. If YES in S6, the control calculation units 161 and 162 of each system of the first actuator 10 and the control calculation units 261 and 262 of each system of the second actuator 20 continue the motor drive control based on the information of only the own system without stopping the motor drive control in S7. If the communications CM1 and CM2 between the systems are also normal, it is determined as NO in S6, and the motor drive control in the normal state is continued.

In Patent Document, only the motor directly controlled by the failed ECU is stopped, and the motor controlled by the paired ECU that communicates with each other is continued as it is. In this configuration, for example, if the first system of the first actuator 10 fails, the motor drive unit 271 controlled by the control calculation unit 261 of the first system of the second actuator 20 may output erroneously and the system may malfunction.

On the other hand, in the present embodiment, in the case of a failure of either the first actuator 10 or the second actuator 20, or a failure of communication between actuators, erroneous output of the other actuator due to the failure is prevented, and the system malfunction is avoided. Further, since the motor drive control is continued by the control calculation unit of the normal system in both the actuators 10 and 20, the drive function can be ensured. Therefore, the fail-safe function is appropriately realized.

Here, the motor drive control can be quickly stopped by transmitting an abnormal signal from the control calculation unit on the failed actuator side as a means for the other actuator to acquire information on the occurrence of the failure. Alternatively, the control calculation unit on the normal actuator side detects the failure, so that the failure information can be recognized even when the communication between the actuators is a failure. Further, by using both means in combination, it is possible to execute the stop process of the motor drive control more quickly and surely, and the reliability is further improved.

In addition, the control calculation units of two systems in the same actuator send and receive information to and from each other through the communication between the systems, so that the motor drive units of two systems can be operated in cooperation under normal conditions to realize the motor drive with a good output balance. However, when only the communication between the systems fails, the control calculation unit does not stop the motor drive control, but continues the motor drive control based on only information of the own system. As a result, the total output of the two systems can be maintained as high as possible even if the output balance between the systems may be slightly biased. In addition, redundancy can be maintained.

Next, the motor drive systems of the second to fourth embodiments, in which the number of actuators or the number of systems is different from that of the first embodiment, will be described with reference to the same schematic diagram as in FIG. 2. In the second to fourth embodiments, the point that the information is redundantly input to each control calculation unit is the same as that of the first embodiment, and the illustration in each figure is omitted. Further, when there are a large number of applicable numbers, the description of the numbers is omitted as appropriate. The number used only in the second to fourth embodiments is not described as a reference number in the claims.

Second Embodiment

Figure 6:
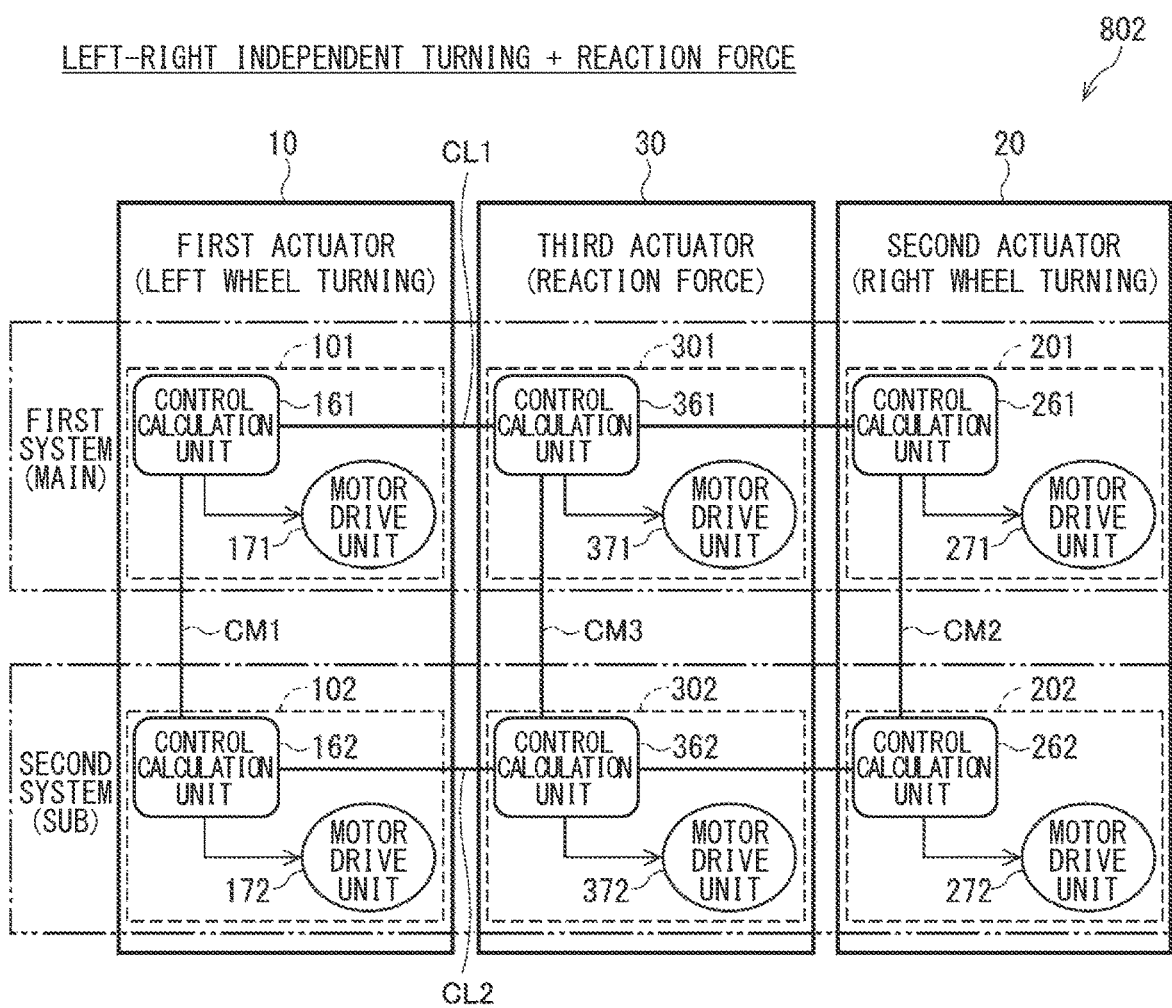
FIG. 6 is a schematic diagram of a motor drive system according to a second embodiment.

The motor drive system 802 of the second embodiment shown in FIG. 6 includes three actuators 10, 20, and 30 having a redundant two system configuration. For example, in the motor drive system 802, in addition to the first and second actuators 10 and 20 for left-right independent turning according to the first embodiment, the third actuator 30 that generates a reaction force torque in the steer-by-wire system is provided as an "additional actuator". The third actuator 30 gives the driver an appropriate steering feeling by applying a reaction force torque corresponding to the steering torque and the road surface reaction force to a steering wheel 91.

Similar to the first actuator 10 and the second actuator 20, the third actuator 30 is redundantly provided with a control calculation unit 361 of a first system 301 and a control calculation unit 362 of a second system 302. Further, a motor drive unit 371 of the first system 301 and a motor drive unit 372 of the second system 302 are redundantly provided. Further, the control calculation unit 361 of the first system 301 and the control calculation unit 362 of the second system 302 mutually transmit and receive information by a communication CM3 between systems in the third actuator 30.

The control calculation unit 361 of the first system 301 of the third actuator 30 transmits and receives information to and from the control calculation units 161 and 261 of the first system of the first actuator 10 and the second actuator 20 by the communication CL1 between the actuators of the first system. The control calculation unit 362 of the second system 302 of the third actuator 30 transmits and receives information to and from the control calculation units 162 and 262 of the second system of the first actuator 10 and the second actuator 20 by the communication CL2 between the actuators of the second system.

It is assumed that a failure occurs in any system in either of the three actuators 10, 20, and 30, or a failure occurs in the communication between actuators of any system. At this time, the control calculation unit of each of the actuators 10, 20, and 30 of the system in which the failure has occurred stops the motor drive control. Then, the motor drive control is continued by the control calculation unit of the normal system in all the actuators 10, 20 and 30. In the second embodiment, the same action and effect as in the first embodiment can be obtained.

Third Embodiment

A motor drive system 803 of the third embodiment shown in FIG. 7 is applied to a vehicle in which the four wheels on the left, right, front and rear are independently turned and does not have a reaction force actuator, and includes the four actuators 10, 20, 30, and 40 having a redundant two system configuration. That is, the motor drive system 803 includes the third actuator 30 and the fourth actuator 40 as "additional actuator". For example, the first actuator 10 and the second actuator 20 turn the left front wheel and the right front wheel, and the third actuator 30 and the fourth actuator 40 turn the left rear wheel and the right rear wheel.

The configurations of the first and second actuators 10 and 20 correspond to that of the first embodiment. Similarly, the third actuator 30 is redundantly provided with the control calculation unit 361 of the first system 301 and the control calculation unit 362 of the second system 302, and is redundantly provided with the motor drive unit 371 of the first system 301 and the motor drive unit 372 of the second system 302 respectively. The fourth actuator 40 is redundantly provided with the control calculation unit 461 of a first system 401 and a control calculation unit 462 of a second system 402, and is redundantly provided with the motor drive unit 471 of the first system 401 and the motor drive unit 472 of the second system 402 respectively.

Further, the control calculation unit 361 of the first system 301 and the control calculation unit 362 of the second system 302 mutually transmit and receive information by a communication CM3 between systems in the third actuator 30. Further, the control calculation unit 461 of the first system 401 and the control calculation unit 462 of the second system 402 mutually transmit and receive information by a communication CM4 between systems in the fourth actuator 40.

Further, the control calculation units 161, 261, 361, and 461 of the first system of each of the actuators 10, 20, 30, and 40 mutually transmit and receive information by the communication CL1 between the actuators of the first system. The control calculation units 162, 262, 362, and 462 of the second system of each of the actuators 10, 20, 30, and 40 mutually transmit and receive information by the communication CL2 between the actuators of the second system.

It is assumed that a failure occurs in any system in either of the four actuators 10, 20, 30 and 40, or a failure occurs in the communication between actuators of any system. At this time, the control calculation unit of each of the actuators 10, 20, 30 and 40 of the system in which the failure has occurred stops the motor drive control. Then, the motor drive control is continued by the control calculation unit of the normal system in all the actuators 10, 20 30 and 40. In the third embodiment, the same action and effect as in the first embodiment can be obtained.

As a modification of the third embodiment, the same reaction force actuator as in the second embodiment may be further added as a fifth actuator. Similarly, in that case, the control calculation units of the same system of the five actuators transmit and receive information to and from each other by the communication between the actuators. When a failure occurs, the control calculation unit of each actuator of the system in which the failure has occurred stops the motor drive control, and the control calculation unit of the normal system in all the actuators continues the motor drive control.

Here, with reference to FIGS. 8A to 8D, a connection form (topology) of communication between actuators will be described. FIGS. 8A to 8D illustrate the motor drive system with four actuators 10, 20, 30, and 40. In FIGS. 8A to 8D, the blocks of the actuators 10, 20, 30, and 40 represent the control calculation unit of the same system.

Figure 8A:
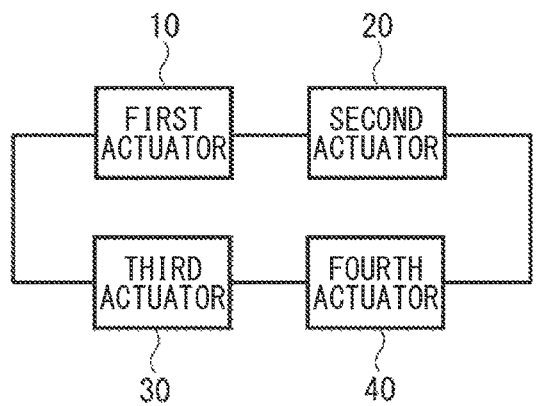
FIG. 8A is a diagram illustrating a connection mode of communication between four actuators.
Figure 8B:
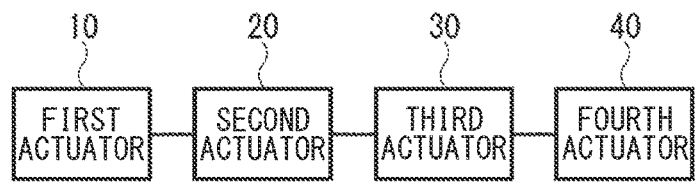
FIG. 8B is a diagram illustrating a connection mode of communication between four actuators.

FIG. 8A shows a simplified connection form in the motor drive system 803 of FIG. 7. The control calculation units of the four actuators 10, 20, 30, and 40 are connected in a ring shape. In this example, it is possible to communicate the control calculation unit of the first actuator 10 with the control calculation unit of the fourth actuator 40 via the control calculation units of other actuators, and communicate the control calculation unit of the second actuator 20 with the control calculation unit of the third actuator 30 via the control calculation units of other actuators. FIG. 8B shows a series type connection form. The control calculation unit of each actuator 10, 20, 30, 40 can communicate with the control calculation unit of all the actuators via at least the control calculation unit of other actuators.

Figure 8C:
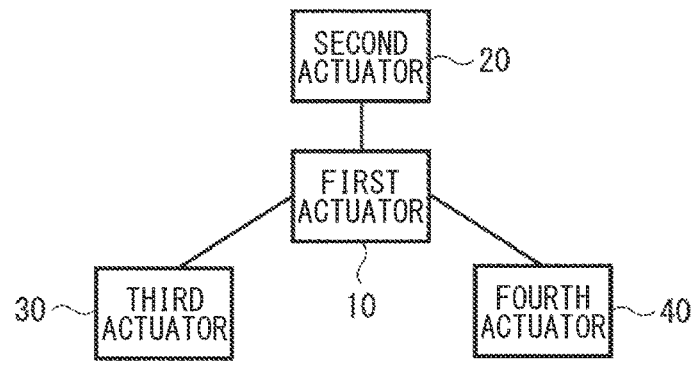
FIG. 8C is a diagram illustrating a connection mode of communication between four actuators.
Figure 8D:
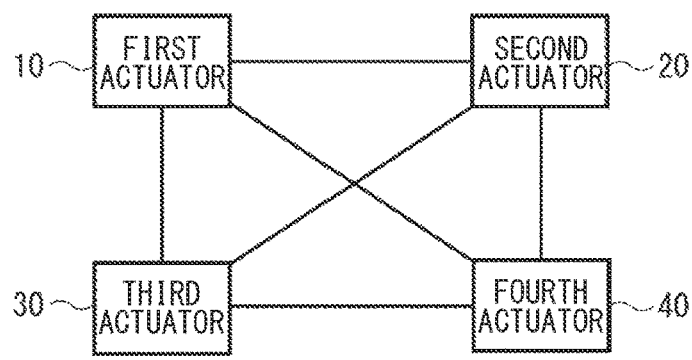
FIG. 8D is a diagram illustrating a connection mode of communication between four actuators.

FIG. 8C shows a star-shaped connection form. In this example, the control calculation unit of the first actuator 10 at a center directly communicates with the control calculation units of all the other actuators. The control calculation units of the other actuators can communicate with each other via the control calculation unit of the first actuator 10. FIG. 8D shows a mesh type connection form. The control calculation unit of each actuator 10, 20, 30 and 40 directly communicates with the control calculation unit of all the other actuators.

Since the merits and demerits of each connection form are well-known technologies in the field of communication technology, the description thereof will be omitted. When there are three actuators, the ring type and the mesh type are combined, and the series type and the star type are combined. As described above, the connection form of the communication between the actuators between the three or more actuators can be appropriately set by the above-mentioned basic form or a combination thereof.

Fourth Embodiment

Figure 9:
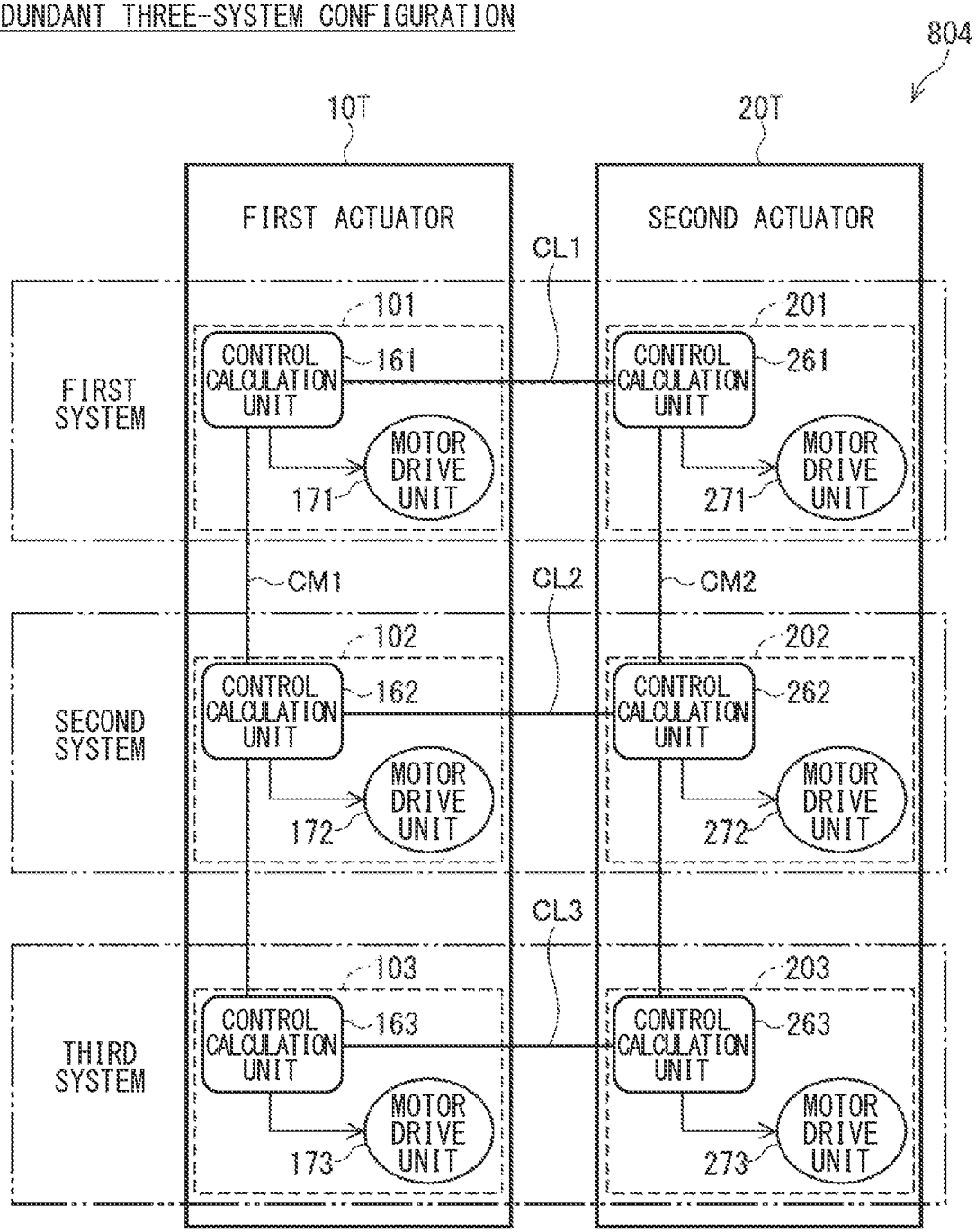
FIG. 9 is an overall configuration diagram of a motor drive system according to a fourth embodiment.

A motor drive system 804 of the fourth embodiment shown in FIG. 9 includes two actuators 10T and 20T having a redundant three-system configuration. In the first actuator 10T, in addition to the same two-system configuration as in the first embodiment, the control calculation unit 163 and the motor drive unit 173 of a third system 103 are further redundantly provided. In the second actuator 20T, in addition to the same two-system configuration as in the first embodiment, the control calculation unit 263 and the motor drive unit 273 of the third system 203 are further redundantly provided.

The control calculation units 161, 162, and 163 of the three systems transmit and receive information to and from each other by the communication CM1 between the systems in the first actuator 10T. The control calculation units 261, 262, and 263 of the three systems transmit and receive information to and from each other by the communication CM2 between the systems in the second actuator 20T. Further, the control calculation units 163 and 263 of the third system of the first and second actuators 10T and 20T transmit and receive information to and from each other by the communication CL3 between the actuators.

In the motor drive system 804 having the redundant three-system configuration, for example, when a failure occurs simultaneously in the first system 101 of the first actuator 10T and the second system 202 of the second actuator 20T, the control calculation units 161 and 261 and the control calculation units 162 and 262 of the first system of each of the actuators 10T and 20T stop the motor drive control. Then, the motor drive control is continued by the control calculation units 163 and 263 of the third system, which are normal in both actuators 10T and 20T.

As a modification of the fourth embodiment, the two actuators may have a redundant configuration of four or more systems. Further, the same technical idea can be extended to a motor drive system including three or more actuators having a redundant configuration of three or more systems in combination with the second and third embodiments. Regarding the process when a part of the system fails and the motor drive control is continued only in the remaining normal system, the output increase degree or the upper limit may be switched, for example, based on the ratio of the number of operating systems before and after the failure.

Further, the connection form (topology) of the communication between the systems of three or more systems may be considered by replacing the connection form of the communication between the actuators shown in FIGS. 8A to 8D with the communication between the systems. That is, in the case of the ring type or the series type, the control calculation unit of each system can communicate with the control calculation unit of all systems at least via the control calculation unit of other systems. In the case of the star type, the control calculation unit of one system directly communicates with the control calculation unit of all the other systems. In the case of the mesh type, the control calculation unit of each system directly communicates with the control calculation unit of all other systems. As described above, the connection form of communication between three or more systems can be appropriately set by the above-mentioned basic form or a combination thereof.

Figure 10:
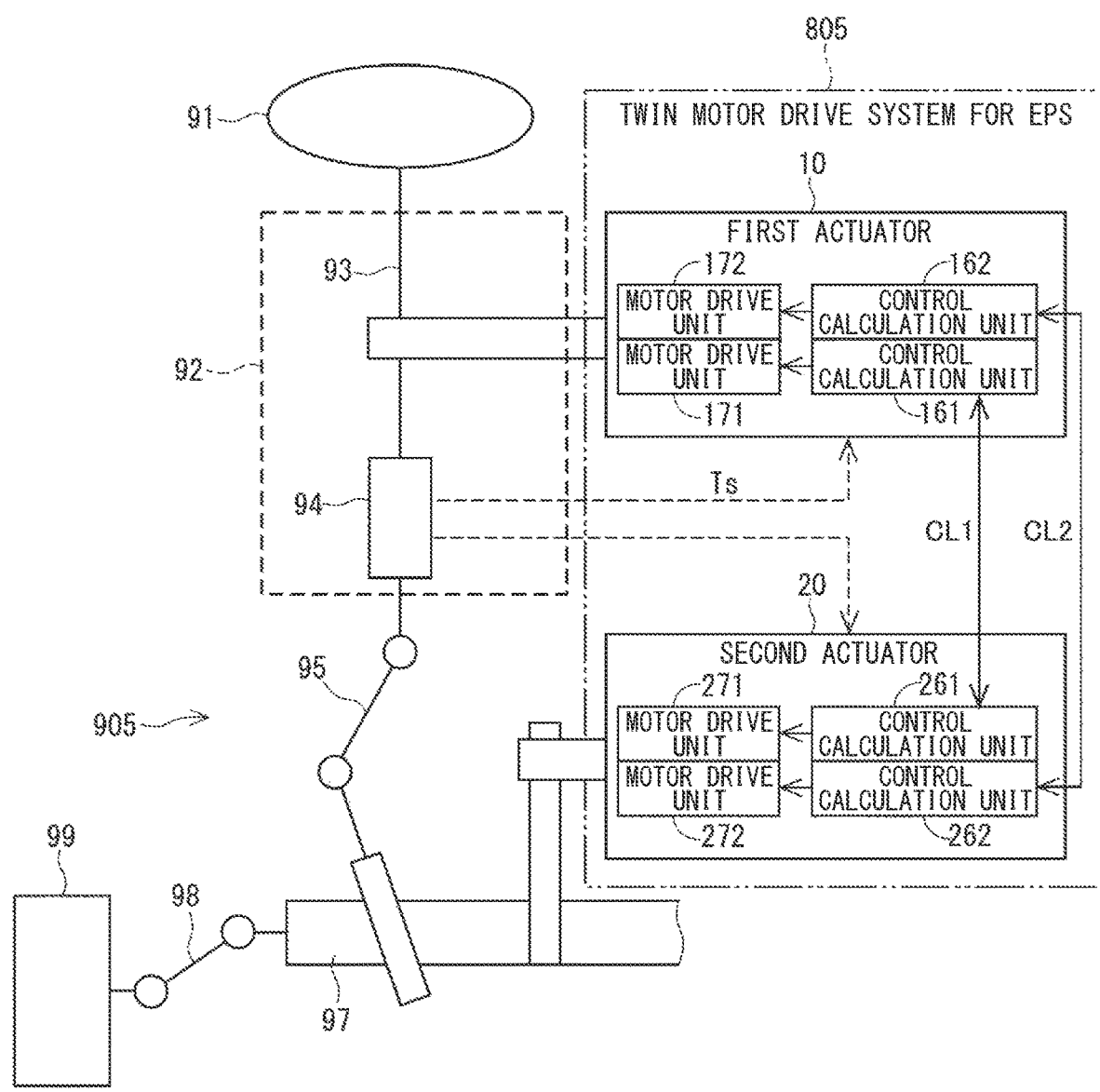
FIG. 10 is an overall configuration diagram of a motor drive system according to another embodiment.

Other Embodiments (A) As an embodiment different from the above embodiment applied to the automatic turning system and the steer-by-wire system of the vehicle, FIG. 10 shows an example of a twin motor drive system 805 for electric power steering (EPS). Generally, in the electric power steering system, a steering assist motor is provided on either a column or a rack. However, as disclosed in Japanese Patent Application Laid-Open No. 2004-82798 and the like, a configuration in which two steering assist motors are provided on both the column and the rack is known for the purpose of increasing the output and improving the steerability.

Unlike the automatic turning system 901 shown in FIG. 1, a steering system 905 shown in FIG. 10 is mechanically connected to the steering mechanism steered by the driver and the turning mechanism. The steering system 905 includes the steering wheel 91, a steering shaft 93, an intermediate shaft 95, a rack 97 and the like. The steering wheel 91 is connected to the intermediate shaft 95 via the steering shaft 93. At the end of the intermediate shaft 95, rotation is converted into reciprocating motion by a rack and pinion mechanism so as to transmit to the rack 97. When the rack 97 reciprocates, the wheels 99 are turned via a knuckle arm 98. Wheel 99 shows only one side, and the wheel on the other side is not shown.

In the twin motor drive system 805, the first actuator 10 having a redundant two-system configuration is provided on a column 92 and rotates the steering shaft 93 housed in the column 92. The second actuator 20 having a redundant two-system configuration is provided to the rack 97 and reciprocates the rack 97 via the rack and pinion mechanism. A steering torque Ts detected by a steering torque sensor 94 is input to each of the actuators 10 and 20.

The position of the steering torque sensor 94 on the steering shaft 93 may be on the steering wheel 91 side with respect to a connection portion with the first actuator 10. Preferably, the information on the steering torque Ts is redundantly input to the control calculation units 161 and 162 of each system of the first actuator 10 and the control calculation units 261 and 262 of each system of the second actuator 20.

In the present embodiment, the first actuator 10 and the second actuator 20 cooperate to output the steering assist torque, so that a high output steering assist function is realized. For example, when a failure occurs in the first system of the first actuator 10, the control calculation units 161 and 261 of the first system of each actuator 10 and 20 stop the motor drive control. Then, the motor drive control is continued by the control calculation units 162 and 262 of the second system, which are normal in both actuators 10 and 20. As a result, it is possible to maintain the steering assist function even when the failure occurs in some parts. In addition, the motor drive system of the present disclosure is not limited to vehicles, and may be applied to other vehicles, general machines, and the like.

(B) In the above embodiment, the communication between the systems is performed by each actuator, information to the control calculation unit is redundantly input, and the output of the motor drive unit is increased when one system is driven. However, in other embodiments, the communication between the systems may be performed by only one actuator, and information to the control calculation unit may be redundantly input by only one actuator. Alternatively, the output of the motor drive unit may be increased when one system is driven by using only one actuator. Further, when there is no request from the system, it is not necessary to perform the communication between the systems, the redundant input of information, and the output increase process when one system is driven in any system. In the above embodiment, as a means for the other actuator to acquire information on the occurrence of a failure, abnormality information is transmitted from the control calculation unit on the failed actuator side. However, as another embodiment, the control calculation unit on the failed actuator side may stop the communication between the actuators.

(C) The motor drive system of the present disclosure includes two or more actuators having a redundant configuration for outputting the torque, and the stop or continuation of the motor drive control by the control calculation unit of each actuator is switched in a unit of the system through communication between the actuators. However, in addition to the actuator subject to this control, other independently operating electric actuators and hydraulic or pneumatic actuators may exist in the entire system.

The present disclosure is not limited to the embodiment described above but various modifications may be made within the scope of the present disclosure.

The control calculation unit and method described in the present disclosure may be implemented by a special purpose computer which is configured with a memory and a processor programmed to execute one or more particular functions embodied in computer programs of the memory. Alternatively, the control calculation unit described in the present disclosure and the method thereof may be realized by a dedicated computer configured as a processor with one or more dedicated hardware logic circuits. Alternatively, the control calculation unit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

The present disclosure has been made in accordance with the embodiments. However, the present disclosure is not limited to such embodiments and configurations. The present disclosure also encompasses various modifications and variations within the scope of equivalents. Furthermore, various combination and formation, and other combination and formation including one, more than one or less than one element may be made in the present disclosure.

What is claimed is:

1. A motor drive system, comprising:
   a first actuator configured to function as a motor that outputs a torque, and having a plurality of control calculation units provided redundantly configured to perform calculations related to a motor drive control, and a plurality of motor drive units provided redundantly configured to drive based on a drive signal generated by a corresponding control calculation unit and output the torque; and
   a second actuator configured to function as a motor that outputs a torque, and having a plurality of control calculation units provided redundantly configured to perform calculations related to a motor drive control, and a plurality of motor drive units provided redundantly configured to drive based on a drive signal generated by a corresponding control calculation unit and output the torque, wherein
   when a unit of a combination of the control calculation unit and the motor drive unit corresponding to each other in each actuator is defined as system,
   in the first actuator and the second actuator, the control calculation units of the systems paired with each other transmit and receive information to and from each other by a communication between the actuators,
   when a failure occurs in any system in either of the two actuators, or when a failure occurs in the communication between the actuators of either system,
      the control calculation unit of each of the actuators in the system in which the failure has occurred stops a motor drive control, and the control calculation unit of a normal system in both actuators continues the motor drive control.

2. The motor drive system according to claim 1, wherein
   when a failure occurs in any system in either of the two actuators, and the communication between the actuators in the system is normal,
   the control calculation unit of the system in which the failure has occurred in the actuator in which the failure has occurred transmits an abnormality signal to the control calculation unit of the other system paired with the actuator, and
   the control calculation unit that has received the abnormality signal stops the motor drive control.

3. The motor drive system according to claim 1, wherein,
   the control calculation unit of each system of each actuator stops the motor drive control by itself, when it detects that a failure has occurred in the other system paired with the actuator, or that a failure has occurred in the communication between the actuators of the own system.

4. The motor drive system according to claim 1, wherein
   in at least one of the first actuator and the second actuator, the plurality of control calculation units in the same actuator mutually transmit and receive information by a communication between the systems.

5. The motor drive system according to claim 4, wherein
   when the communication between the systems fails, the control calculation unit of each system continues the motor drive control based on an information of only its own system.

6. The motor drive system according to claim 1, wherein
   an information to the control calculation unit of each system is redundantly input in at least one of the first actuator and the second actuator.

7. The motor drive system according to claim 1, wherein
   in at least one of the first actuator and the second actuator, the control calculation unit of a normal side system increases the output of the motor drive unit of the normal side system with respect to the output of both systems at normal times so as to supplement the output of the motor drive unit of a failure side system.

8. The motor drive system according to claim 1, further comprising,
   in addition to the first actuator and the second actuator, one or more additional actuators having a plurality of control calculation units provided redundantly that perform calculations related to motor drive control, and a plurality of motor drive units provided redundantly that output torque based on a drive signal generated by a corresponding control calculation unit, wherein
   the control calculation units of the additional actuator transmit receive information to and from the control calculation units of other actuators by the communication between the actuators,
   when a failure occurs in any system in one of the three or more actuators, or when a failure occurs in the communication between the actuators of any system,
   the control calculation unit of each of the actuators in the system in which the failure has occurred stops the motor drive control, and the control calculation unit of a normal system in all actuators continues the motor drive control.

9. The motor drive system according to claim 1, wherein
   in at least one actuator, the plurality of control calculation units or the plurality of motor drive units have three or more redundantly provided systems.

10. The motor drive system according to claim 1, wherein
    the motor drive system is applied to a steering system a vehicle in which a left wheel and a right wheel are independently turned, and
    the first actuator and the second actuator are actuators for a left wheel turning and a right wheel turning, respectively.

11. The motor drive system according to claim 8, wherein
    the motor drive system is applied to a steer-by-wire in a vehicle, and
    one additional actuator is an actuator configured to generate a reaction force torque.

12. The motor drive system according to claim 8, wherein
    the motor drive system is applied to a turning system of a vehicle in which four wheels turn independently,
    the first actuator and the second actuator are actuators are actuators for turning a left front wheel and a right front wheel, respectively, and
    the two additional actuators are actuators configured to turn a left rear wheel and a right rear wheel, respectively.

13. The motor drive system according to claim 1, wherein
the motor drive system is applied to an electric power steering system in a vehicle, and
the first actuator and the second actuator function as two steering assist motors provided on a column and a rack, respectively.

14. A motor drive system, comprising:
a first actuator configured to function as a motor that outputs a torque, and having a plurality of control calculation units provided redundantly configured to perform calculations related to a motor drive control, and a plurality of motor drive units provided redundantly configured to drive based on a drive signal generated by a corresponding control calculation unit and output the torque; and
a second actuator configured to function as a motor that outputs a torque, and having a plurality of control calculation units provided redundantly configured to perform calculations related to a motor drive control, and a plurality of motor drive units provided redundantly configured to drive based on a drive signal generated by a corresponding control calculation unit and output the torque, wherein
when a unit of a combination of the control calculation unit and the motor drive unit corresponding to each other in each actuator is defined as system,
in the first actuator and the second actuator, the control calculation units of the systems paired with each other transmit and receive information to and from each other by a communication between the actuators,
a plurality of control calculation units of the first actuator and the second actuator have a computer including a processor and a memory that stores instructions configured to, when executed by the processor, cause the processor to
determine that a failure occurs in any system in either of the two actuators, or that a failure occurs in the communication between the actuators of either system,
stop a motor drive control of each of the actuators in the system in which the failure has occurred, and
continue the motor drive control of a normal system in both actuators.

* * * * *